United States Patent [19]

Lin et al.

[11] Patent Number: 5,959,022
[45] Date of Patent: Sep. 28, 1999

[54] COMPATIBLE POLYVINYLIDENE FLUORIDE BLENDS WITH POLYMERS CONTAINING IMIDE MOIETIES

[75] Inventors: Shiow-Ching Lin, Lawrenceville, N.J.; Steven John Burks, Carpentersville, Ill.

[73] Assignee: Ausimont USA, Inc., Thorofare, N.J.

[21] Appl. No.: 09/053,324

[22] Filed: Apr. 1, 1998

[51] Int. Cl.$^6$ .............. C08L 37/00; C08L 27/12
[52] U.S. Cl. .......... 524/520; 524/517; 525/180; 525/199
[58] Field of Search ............ 525/199, 180; 524/517, 520

[56] References Cited

U.S. PATENT DOCUMENTS

| | | | |
|---|---|---|---|
| 3,668,193 | 6/1972 | King | 525/180 |
| 4,433,104 | 2/1984 | Giles, Jr. | 525/180 |
| 4,599,383 | 7/1986 | Satoji | 525/180 |

*Primary Examiner*—Ana Woodward
*Attorney, Agent, or Firm*—Norris, McLaughlin & Marcus

[57] ABSTRACT

A compatible blend of superior mechanical strength, hardness and abrasion or mar resistance comprising PVDF and a compatible organic polymer containing one or more imide groups. The alloy consisting of PVDF and a polymer containing imide groups is prepared by dissolving, separately, the PVDF and polymer in a solvent and blending the solutions to provide the required composition. The alloy can also be prepared by dispersing PVDF powder in a solution of polymer containing imide groups. After heating and drying, a homogeneous alloy is formed. In addition, melt extrusion of PVDF with the imide-containing polymer also generates the desired PVDF alloy.

7 Claims, No Drawings

COMPATIBLE POLYVINYLIDENE FLUORIDE BLENDS WITH POLYMERS CONTAINING IMIDE MOIETIES

BACKGROUND OF INVENTION

The present invention relates to a compatible alloy comprising polyvinylidene fluoride ("PVDF") and compatible polymers containing imide moieties. Imide containing polymers usually have a higher heat resistance and dimensional stability than PVDF. The greater material strength of an imide polymer is expected to result in the favorable characteristics of increased hardness and abrasion or mar resistance for a PVDF after forming a compatible blend. Increased hardness and abrasion or mar resistance is beneficial to many applications of PVDF blends, including use of PVDF blends in film form or, otherwise, as a coating material.

PVDF has application in the construction industry as an architectural coating because its excellent weatherability provides for long lasting coatings. PVDF is widely used in the chemical processing industry for piping and valves and as lining and coating material for storage tanks and reaction vessels because of its mechanical strength and resistance to chemical degradation. PVDF also possesses desireable electrical properties for use in wire and cables.

PVDF has a glass transition temperature around 45° C. and is a rubbery material in its amorphous state at room temperature. PVDF has high crystallinity in its solid state which results in a high modulus and good mechanical strength. PVDF coatings are generally thermally stable and resistant to weathering and thermal and chemical degradation. For certain applications, optical clarity of PVDF is a significant characteristic. Hardness and abrasion or mar resistance are significant criteria for the performance of PVDF as an architectural coating and in the chemical processing industry.

Blending polymer has been an important industrial approach towards development of polymeric materials. PVDF has been identified as compatible with a few industrial polymers, including the alkyl methacrylate and alkyl acrylates having carbon content on alkyl groups of less than 3. The polymers compatible with PVDF have the common characteristic of high concentrations of C=O groups, particularly on side chains of the polymer. It is known from prior art that PVDF is compatible with poly (methylmethacrylate) ["PMMA"]. See, for example, U.S. Pat. No. 4,770,939. PVDF is compatible with acrylic resins because of hydrogen bonding between C=O groups of the acrylic resin and the $CH_2$ groups of the vinylidene fluoride.

It is known in the art that PVDF, blended with an acrylic resin at around a 70:30 ratio by weight of PVDF to acrylic resin; provides optimum material performance with respect to criteria such as adhesion, toughness and optical clarity. PVDF/acrylic resin alloy systems, however, generally have reduced hardness, and abrasion or mar resistance compared to PVDF alone. The reduction in hardness and abrasion or mar resistance serves to limit the application of PVDF blends as a coating material.

SUMMARY OF THE INVENTION

It is an object of the present invention to develop alloys of PVDF and compatible polymers containing imide moieties to formulate PVDF based materials with superior hardness and abrasion or mar resistance. Accordingly, the present invention addresses the combination of PVDF and a copolymer of N-cyclohexyl maleimide and MMA to prove compatibility of PVDF with polymers containing imide groups and the performance characteristics of such novel alloy systems. Heretofore, it was unknown that PVDF is compatible with polymers containing imide moieties and that blends of such compatible materials would form an alloy of superior hardness and abrasion or mar resistance.

DETAILED DESCRIPTION OF THE INVENTION

In the following description, the invention is described in terms of a preferred embodiment, but such description should not limit the scope of the invention, which is set forth in the accompanying claims.

PVDF has a glass transition temperature around −45° C. and a high crystallinity of 45 to 55 percent, which results in good material performance. Compatible blends of PVDF and acrylic resins result in significant reductions in crystallinity, hardness and abrasion resistance. The technical approach to developing a PVDF alloy without the corresponding dramatic loss in hardness and abrasion resistance is use of a polymer compatible with PVDF that has a high glass transition temperature.

The acrylic polymers compatible with PVDF as disclosed in the art share the common characteristic of high concentrations of C=O groups, particularly in the side chains. An imide group containing two C=O linkages in a monomer segment is expected to provide an excellent inter-segmental interaction with vinylidene fluoride unit to result in good compatibility between PVDF and a polymer containing imide segments. Polymers containing imide groups have high heat resistance and glass transition temperatures because of the rigidity of maleimide segments which when blended with PVDF, serves to increase abrasion resistance and hardness of the blended material which is an attractive feature for PVDF blends. Polymers that include imide groups are expected to be compatible with PVDF because of the thermodynamic interactions and hydrogen bonding between the C=O linkage of the imide and $CH_2$ in the vinylidene fluoride segments.

Copolymers of MMA and N-cyclohexyl maleimide of various monomer compositions were formulated to demonstrate aspects of the present invention. Two commercially available polymers containing n-cyclohexylmaleimide, HHA 8 and HHA 16, were used. The imide polymers selected have glass transition temperatures of 126° C. and 130° C. which are higher than PMMA known to have a glass transition temperature around 105° C. Since the glass transition temperatures of the imide polymers used to demonstrate aspects of this invention are higher than PMMA alone, it is expected that blends of PVDF and copolymers of MMA and N-cyclohexyl maleimide will have greater hardness and abrasion or mar resistance than compatible PVDF blends known in the art.

The melting temperature depression of a crystalline or semi-crystalline polymer by a compatible polymer is a powerful tool for compatibility characterization. The approach of PVDF melting temperature depression is used to demonstrate aspects of this invention, including evaluation of the compatibility of PVDF with co-polymers of methyl methacrylate and N-cyclohexyl maleimide. Differential scanning calorimeter methods ("DSC") are effective for measurement of the melting point of a polymer or blend. The degree of melting temperature depression is a function of the content of the compatible polymer in the blend.

EXAMPLES 1–6

HYLAR® 5000 brand PVDF supplied by the assignee of the present application and a copolymer of PMMA and N-cyclohexyl maleimide (Trade name HHA 16 resin) were dissolved separately in N-methylpyrrolidone. The two polymer substances were then blended at various compositions to obtain solutions having 65, 70, 75, 80, 85, 90 and 95 weight percent of PVDF content in dry blends. The blended solutions were transferred to aluminum dishes and dried at 93° C. for 16 hours. The dried films were then characterized by use of DSC. The samples were then heated to 220° C., cooled back to room temperature and, then, heated again to 220° C. in a nitrogen atmosphere. During this heating and cooling process, the rate of DSC characterization was fixed at 10° C. per minute.

Three different crystal forms of PVDF occur naturally. These forms are designated as $\alpha(II)$, $\beta(I)$ and $\gamma(III)$. The relative amounts of $\beta(I)$ and $\gamma(III)$ crystal in the PVDF depends on the thermal history of the material, [See, S. O. Saki and Y. Ishida, J. Polym. Sci.: Polym. Phys. Ed., 13, 1071(1975)] and are dramatically affected by the presence of a compatible polymer, such as PMMA.

To establish a comparison reference, DSC analysis was conducted on a blend containing 5.2 weight percent of a commercially available resin containing N-cyclohexyl maleimide (HHA16). DSC analysis disclosed two melting points for a cast film of this blend, 158.46° C. and 163.2° C. which are equivalent to that of the $\alpha$ and $\gamma$ crystal forms. After cooling at a rate of 10° C. per minute, the blend has a crystallization peak of 116.9° C. After re-heating, the $\alpha$ crystal form melts at 160.2° C. and an additional endothermic shoulder of 155° C. is observed.

To understand the compatibility between PVDF and polymers containing imide groups, the melting temperature depression of PVDF by the addition of HHA 16 resin was studied. Set forth in the table below are the results of the DSC analysis for the alloy system consisting of PVDF, PMMA and HHA 16 at various compositions for both cast and remelt blends.

TABLE 1

| PVDF melting point of $\alpha$ crystal, °C. | | |
|---|---|---|
| HHA resin content, % | HHA 16-Cast | HHA 16-Remelt |
| 5.21 | 158.4 | 160.2 |
| 10.2 | 158.2 | 159.2 |
| 15.12 | 157.2 | 158.6 |
| 19.98 | 155.8 | 157.6 |
| 25.08 | 150.5 | 154.7 |
| 29.91 | 146.4 | 153.7 |
| 34.74 | 147.3 | 152.9 |

The melting point of the PVDF ($\alpha$ crystal) in the alloy containing PVDF, PMMA and the N-cyclohexyl maleimide, HHA 16, decreases with increasing HHA resin content in the alloy. The melting point temperature depression, encountered with this alloy system is consistent with the melting point depression, as reported in literature, encountered with alloys described in the art consisting of PVDF and compatible PMMA. This consistency in melting point depression indicates that PVDF and a copolymer of N-cyclohexyl maleimide and PMMA have thermodynamic characteristics similar to PVDF/PMM blends known in the art and demonstrates that PVDF and polymers containing imide moieties are compatible.

EXAMPLES 7–12

HYLAR 5000 brand PVDF and a copolymer of methyl methacrylate and N-cyclohexyl maleimide (Trade name HHA 8 resin) were separately dissolved in N-methylpyrrolidone. The two polymer solutions were then blended at various compositions to obtain solutions having 65, 70, 75, 80, 85, 90 and 95 weight percent of PVDF content in dry polymer blends. The blend solutions were transferred to aluminum dishes and dried at 93° C. for 16 hours. The dried films were then characterized by DSC. The samples were then heated to 220° C., cooled back to room temperature and, then, heated again to 220° C. in a nitrogen atmosphere. During this heating and cooling process, the rate of DSC characterization was fixed at 10° C. per minute.

To understand the compatibility between PVDF and polymers containing imide groups, the melting temperature depression of PVDF by the addition of HHA 8 resin was studied. Set forth in the table below are the results of the DSC analysis for the alloy system consisting of PVDF, PMMA and HHA 8 at various compositions for both cast and remelt blends.

TABLE 2

| PVDF melting point of $\alpha$ crystal, °C. | | |
|---|---|---|
| HHA resin content, % | HHA 8-Cast | HHA 8-Remelt |
| 4.92 | 158.5 | 159.8 |
| 10.22 | 157.5 | 159.2 |
| 14.93 | 156.4 | 158.4 |
| 19.98 | 155.5 | 156.9 |
| 24.97 | 151.0 | 152.2 |
| 29.93 | 150.0 | 154.1 |

The melting point of PVDF ($\alpha$ crystal) in the copolymer alloy consisting of PVDF, PMMA and N-cyclohexyl maleimide, HHA 8, decreases with increasing HHA resin content in the alloy. The melting point depression, encountered with this alloy system is consistent with the melting point depression, as reported in the literature, encountered with alloys described in the art consisting of PVDF and compatible PMMA. This consistency in melting point depression indicates that PVDF and a copolymer of N-cyclohexyl maleimide and PMMA have thermodynamic characteristics similar to PVDF/PMMA blends known in the art and demonstrates that PVDF and polymers containing imide moieties are compatible.

Interestingly, evaluation of the data set forth in the two tables above discloses that melting point depression in the alloys consisting of PVDF, PMMA and the HHA resins are not significantly affected by the type of HHA resin used in the blend (HHA 8 or HHA 16). These types of HHA resins contain different amounts of N-cyclohexyl maleimide monomer units. This indicates similar interactions between vinylidene fluoride and methyl methacrylate and between vinylidene fluoride and N-cyclohexyl maleimide, which further demonstrates compatibility between PVDF and polymers containing imide groups.

EXAMPLE 13

Dispersions containing 70 weight percent HYLAR 5000 brand PVDF and 30 weight percent N-cyclohexyl maleimide polymers in isophorone were prepared. Separate dispersions were developed using HHA 8 and HHA 16. The dispersions were prepared to observe optical clarity and hardness after baking at a peak metal temperature of 460° F. For comparison purposes a dispersion containing 70 weight percent HYLAR 5000 brand PVDF and 30 weight percent PMMA resin in isophorone was prepared to observe optical clarity and hardness after baking at peak metal temperature of 460° F.

The coatings comprising HHA 8 and HHA 16 were transparent, which visibility indicates good compatibility between PVDF and polymers containing imide moieties. Optical clarity is a significant characteristic for applications of PVDF coatings.

Most importantly, however, the pencil hardness of the PVDF alloy systems containing HHA 8 and HHA 16 resins were 2H, improved from 1H given by the blend containing 70 weight percent HYLAR 5000 brand PVDF and 30 weight percent PMMA resin. Hence, use of a polymer containing imide moieties in a PVDF alloy results in a compound of superior hardness compared to the alloys of PVDF and an acrylic resin known in the art.

In addition to the preparation method discussed above in Examples 1 through 12, inclusive, the compatible blend of PVDF and a polymer containing imide groups can be prepared by the following methods. PVDF powder can be dispersed in a solution of polymer containing imide groups which, after heating and drying, results in the formation of a homogenous alloy. Melt extrusion of PVDF with the imide containing polymer will generate compatible blends of PVDF and polymers containing side imide groups PVDF powder and polymer containing imide groups may blended to form a paint having increased strength and wear resistance by dispersing PVDF powder in a solvent and dissolving a polymer containing imide groups in a solvent and blending the dispersion and dissolved polymer solution to form the paint.

While the invention has been described in terms of a preferred embodiment, the scope of the invention is set forth as the following claims.

What is claimed is:

1. A polymer blend comprising 65 weight percent to 95 weight percent, based on dry polymer blend, polyvinylidene fluoride and an acrylic polymer having side imide groups.

2. The polymer blend as described in claim 1 wherein said acrylic polymer is a copolymer of methyl methacrylate and N-cyclohexyl maleimide.

3. A process whereby polyvinylidene fluoride powder is dispersed in a solvent and an acrylic polymer containing side imide groups is dissolved in a solvent and the dispersion and dissolved solution are blended to form a paint having increased strength and wear resistance.

4. The process described in claim 1 wherein said polymer containing imide groups is a copolymer of methyl methacrylate and N-cyclohexyl maleimide.

5. A method for preparing a blend of polyvinylidene fluoride and an acrylic polymer containing imide groups whereby polyvinylidene fluoride is subjected to melt extrusion with an acrylic polymer containing side imide groups to form a blend comprising polyvinylidene fluoride and an acrylic polymer containing side imide groups.

6. The process described in claim 5 wherein said polymer containing imide groups is a copolymer of methyl methacrylate and N-cyclohexyl maleimide.

7. A method of forming a homogeneous alloy of polyvinylidene fluoride and a polymer containing side imide groups whereby polyvinylidene fluoride is dispersed in a solution of polymer containing side imide groups and is heated and dried.

* * * * *

UNITED STATES PATENT AND TRADEMARK OFFICE
CERTIFICATE OF CORRECTION

PATENT NO : 5,959,022
DATED : September 28, 1999
INVENTOR(S): Lin, Shiow-Ching and Burks, Steven John It is certified that error appears in the above-identified patent and that said Letters Patent are hereby corrected as shown below:

Column 1, line 27, "45°C" should read -- -45°C --.

Column 3, line 61, "PVDF/PMM" should read --PVDF/PMMA--.

Column 5, line 22, after "side imide groups" insert a period symbol --.--.

Column 6, line 13, after "Claim", delete "1" and insert --3--.

Signed and Sealed this

Twenty-seventh Day of June, 2000

Attest:

Q. TODD DICKINSON

*Attesting Officer*     *Director of Patents and Trademarks*